United States Patent [19]

Fukushima et al.

[11] Patent Number: 5,329,329
[45] Date of Patent: Jul. 12, 1994

[54] ZOOM LENS BARREL UNIT WITH LENS GROUP MOVING MEANS AND MOVEMENT GUIDING MEANS AXIALLY JUXTAPOSED TO ENHANCE BARREL COMPACTNESS

[75] Inventors: Mitsuru Fukushima; Noriyoshi Fujimori; Nobuo Komatsu, all of Suwa, Japan

[73] Assignee: Chinon Kabushiki Kaisha, Suwa, Japan

[21] Appl. No.: 860,409

[22] Filed: Mar. 30, 1992

[30] Foreign Application Priority Data

Jul. 8, 1991 [JP] Japan ................................. 3-166965
Jul. 11, 1991 [JP] Japan ................................. 3-171315

[51] Int. Cl.$^5$ ............................................. G02B 15/14
[52] U.S. Cl. ................................ 354/195.12; 359/694; 359/700
[58] Field of Search .................. 354/195.1, 195.12; 359/694, 696, 699, 700, 701

[56] References Cited

U.S. PATENT DOCUMENTS 4,247,170  1/1981  Yamamoto ........................ 359/705
5,130,851  7/1992  Shirie ................................ 359/700

FOREIGN PATENT DOCUMENTS 0344806  12/1989  European Pat. Off. .
1207731   8/1989  Japan .
1-306808 12/1989  Japan .
2204710   8/1990  Japan .
3180826   8/1991  Japan .

*Primary Examiner*—Michael L. Gellner
*Assistant Examiner*—J. K. Han
*Attorney, Agent, or Firm*—George J. Brandt, Jr.

[57] ABSTRACT

A lens barrel unit for a zoom lens camera which is more compact in the axial optical direction in the retracted state because the lens group moving means and linear movement guiding means are juxtaposed along the optical axis. The lens barrel unit also has a reduced outer diameter due to a reduction in the need for a separate outer helicoid portion of the moving means and elimination of guiding grooves on the inside of the fixed barrel unit.

1 Claim, 12 Drawing Sheets

ZOOM LENS BARREL UNIT WITH LENS GROUP MOVING MEANS AND MOVEMENT GUIDING MEANS AXIALLY JUXTAPOSED TO ENHANCE BARREL COMPACTNESS

BACKGROUND OF THE INVENTION

The present invention relates to a zoom lens barrel unit of a zoom lens camera or other similar device and a viewfinder of a zoom lens camera. More specifically, the present invention relates to a zoom lens barrel unit which is more compact in the retracted position and a viewfinder of a zoom lens camera in which a zoom lens barrel unit is made more compact through the provision of a smaller cam ring for detecting the degree of zooming.

One example of a conventional zoom lens of the prior art is disclosed in Japanese Patent Publication Laid-Open No. 306808/1989. The structure and operation of that conventional zoom lens is bulky both in length and diameter than is desired. This result exists because the inside of the barrel unit in this disclosure has cam grooves required for operation. Also, a moving mechanism is made of several pieces, at least one of which that is required for zoom operation.

A further conventional zoom lens camera which conducts a zooming operation interlockingly with the zooming of a photographic optical system is described, for example, in Japanese Patent Publication Laid-Open No. 207731/1989. A viewfinder of such a conventional zoom lens camera sits on the cam in the barrel so that the viewfinder will move with the cam. This requires that the cam groove be extended to have the a length corresponding to the maximum axial movement of the viewfinder. This requires a longer barrel member than is desired.

The present invention seeks to remedy these drawbacks of the prior art, allowing for the manufacture of a zoom lens which is more compact in the retracted position and a viewfinder of a zoom lens camera in which the zoom lens barrel unit is made more compact through the provision of a smaller cam ring used for detecting the degree of zooming.

OBJECTS AND SUMMARY OF THE INVENTION

Accordingly, it is an object of the present invention to provide a zoom lens barrel unit for a zoom lens camera, and more particularly, to a more compact zoom lens barrel unit.

It is a further object of the invention to provide a viewfinder of a zoom lens camera having a more compact zoom lens barrel unit formed with a smaller cam ring used for detecting the degree of zooming during viewfinder operation.

Briefly stated, the present invention provides a lens barrel unit for a zoom lens camera which is more compact in the axial optical direction in the retracted state because the lens group moving means and linear movement guiding means are juxtaposed along the optical axis. The lens barrel unit also has a reduced outer diameter due to a reduction in the need for a separate outer portion of the moving means and elimination of guiding grooves on the inside of the fixed barrel unit.

According to an embodiment of the invention, there is provided a zoom lens barrel unit comprising: a fixed barrel member, at least first and second lens groups, a cam ring concentrically disposed inside the fixed barrel member, a plurality of cam grooves in the cam ring for guiding at least two lens groups, moving means positioned between the fixed barrel member and the cam ring for moving the cam ring in a first direction along the optical axis the cam ring is rotated about the optical axis inside the barrel member, a linear movement guiding plate disposed within the cam ring parallel to the optical axis and affixed at one of its ends to the fixed barrel member, a rear lens group moving member concentrically disposed inside the cam ring and supporting a rear lens group, the rear lens group moving member including a plurality of guide pins insertable through a set of rear lens group cam grooves of the cam ring, a catching portion insertable into and attachable with the linear movement guiding plate in the optical axial direction through the rear lens group moving member and a plurality of linear movement guiding grooves formed in the rear lens group moving member in the optical axial direction, and a front lens group moving member concentrically disposed inside the rear lens group moving member and supporting a front lens group, the front lens group moving member including a plurality of guide pins insertable through the plurality of linear movement guiding grooves of the rear lens group moving member and a set of front lens group cam grooves in the cam ring.

The rear lens group comprises a plurality of guide pins insertable through a set of rear lens group cam grooves of the cam ring, a catching portion insertable into and attachable with the linear movement guiding plate in the optical axial direction through the rear lens group moving member and a plurality of linear movement guiding grooves formed in the rear lens group moving member in the optical axial direction.

Also, a front lens group moving member concentrically disposed inside said rear lens group moving member and supporting a front lens group is provides. The front lens group comprises a plurality of guide pins insertable through the plurality of linear movement guiding grooves of the rear lens group moving member and a set of front lens group cam grooves of the cam ring.

According to a feature of the invention, there is provided a viewfinder of a zoom lens camera, comprising: a camera body, a fixed barrel member, a cam ring concentrically disposed inside the fixed barrel member and movable in a first direction along an optical axis pursuant to the rotation of the cam ring about the optical axis, a photographic optical system concentrically disposed inside the cam ring and moveable in the first direction interlockingly with the cam ring pursuant to the rotation of the cam ring about the optical axis, and a viewfinder optical system, the viewfinder optical system including an interlocking ring concentrically disposed around an outer surface of the cam ring with a ridge on an outer surface thereof, the interlocking ring being moved interlockingly in a direction of the optical axial with the cam ring, a guiding recess in the fixed barrel member extending generally in an optical axial direction for receiving and guiding the ridge of the interlocking ring, and interlocking means for moving the viewfinder optical system parallel to the optical axis interlockingly with movement of the ridge.

Also, a viewfinder optical system is provided comprising an interlocking ring concentrically disposed around an outer surface of the cam ring with a ridge on an outer surface thereof, whereby the interlocking ring is moved interlockingly in the optical axial direction with the cam ring, a guiding recess formed in the fixed barrel member in an optical axial direction for receiving and guiding the ridge of the interlocking ring and interlocking means for moving the viewfinder optical system in parallel with the optical axis interlockingly with movement of the ridge.

The above, and other objects, features and advantages of the present invention will become apparent from the following description read in conjunction with the accompanying drawings, in which like reference numerals designate the same elements.

DETAILED DESCRIPTION OF PREFERRED EMBODIMENTS

Figure 10:
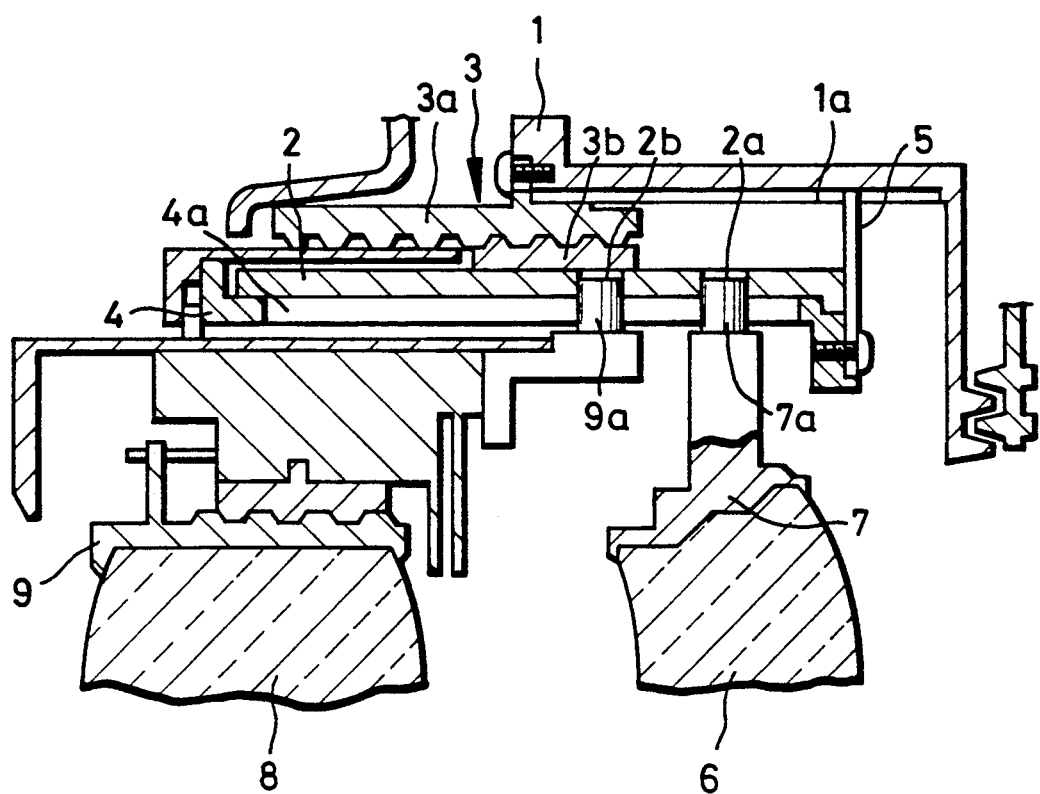
FIG. 10 is a sectional view of a conventional zoom lens barrel of the prior art.

Referring now to FIG. 10, Japanese Patent Publication Laid-Open No. 306808/1989 discloses a cam ring 2 installed in a fixed barrel 1 of a prior-art zoom lens. A moving means 3 for rotationally revolving cam ring 2 is disposed near the front end of fixed barrel 1. Linear motion of moving means 3 causes concomitant movement of the cam ring in the optical axial direction. Moving means 3 consists of an outer helicoid 3a at the fixed barrel side engaging an inner helicoid 3b adjacent cam ring 2.

A guide ring 4 that moves together with cam ring 2 in the optical axial direction is disposed inside cam ring 2. A linear movement guide plate 5 at the rear end of guide ring 4 hooks onto a guiding groove 1a formed in the inner surface of fixed barrel 1 in the optical axial direction thereby preventing rotation of guide ring 4. Guide ring 4 also includes a linear movement guiding groove 4a that is formed therein in the optical axial direction.

A rear group moving frame 7 and a front group moving frame 9, defining the photographic optical system, hold a rear lens group 6 and a front lens group 8, respectively, are installed inside guide ring 4. The rear group moving frame 7 and front group moving frame 9 include guide pins 7a and 9a, respectively, inserted into a cam groove 2a and a cam groove 2b of cam ring 2, respectively, through linear movement guiding groove 4a.

When cam ring 2 is rotated by a driving means (not shown), it moves in the optical axial direction together with guide ring 4, guide ring 4 being restrained from revolving. Rear group moving frame 7 and front group moving frame 9 also move in the optical direction along cam grooves 2a and 2b of cam ring 2, while being restrained from revolving.

In this manner, rear lens 6 and front lens 8, of rear group moving frame 7 and front group moving frame 9, respectively, are extended or retracted.

Figure 11:
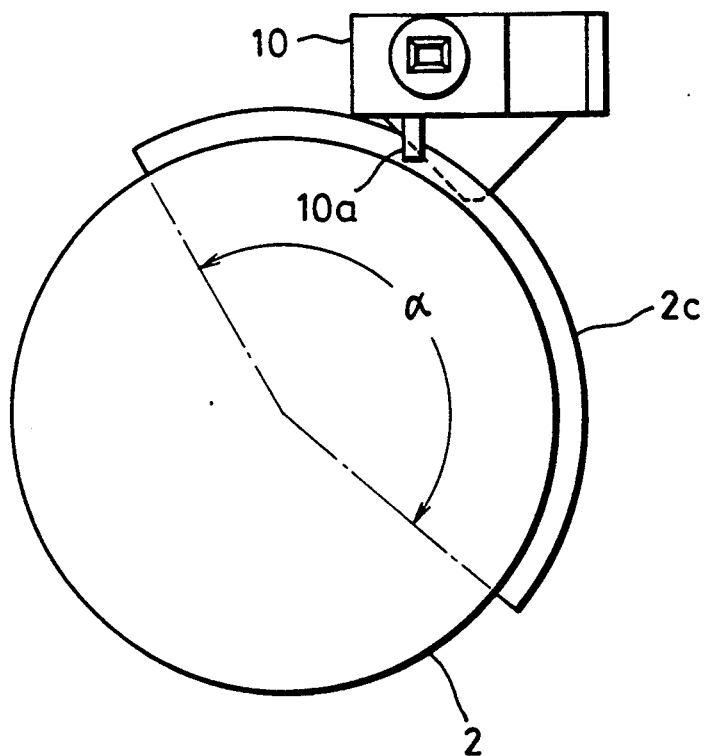
FIG. 11 is a front view of a conventional viewfinder of the prior art.
Figure 12:
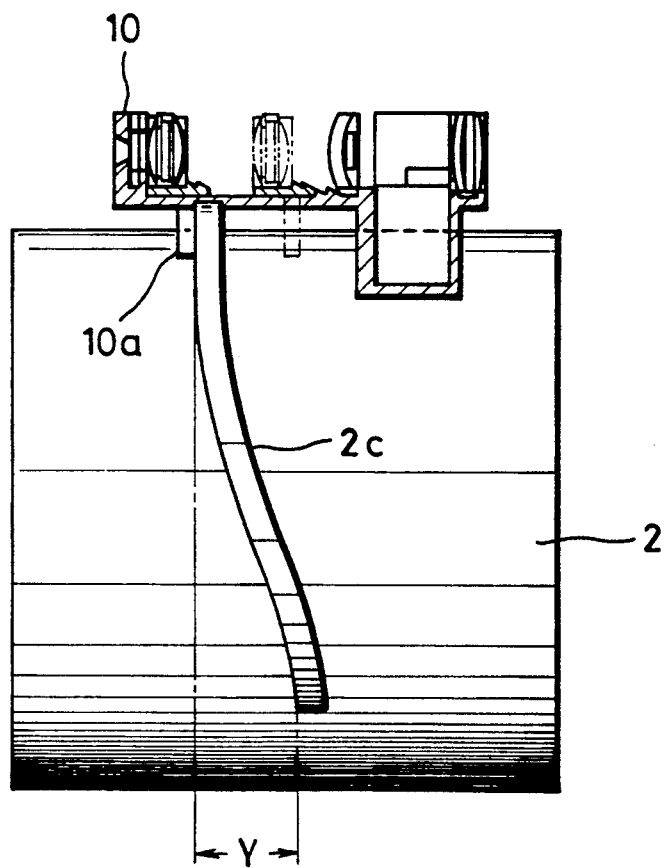
FIG. 12 is a sectional view of a conventional viewfinder of the prior art.

Referring now to FIGS. 11 and 12, a prior-art device disclosed in Japanese Patent Publication Laid-Open No. 207731/1989 has a viewfinder including a cam portion 2c on the outer surface of a cam ring 2. Rotation of cam ring 2 moves the photographic optical system of the camera in the optical axial direction thereby effecting zooming as was described in the example of a conventional zoom lens of the prior art as described above. An interlocking lever 10a installed in a viewfinder optical system 10 attached to the camera body contacts cam portion 2c.

This prior-art device operates as follows. When cam ring 2 is rotated, the photographic optical system moves along the optical axial direction thereby conducting zooming. At the same time, interlocking lever 10a moves along cam portion 2c causing viewfinder optical system 10 to move in the optical axial direction, thereby effecting zooming of the lenses of the viewfinder optical system. In this manner, viewfinder optical system zooming follows photographic optical system zooming.

Zoom lens type cameras are extremely popular today due to their wide ranging viewing capability. There is a need however, to make zoom lens cameras more compact. Compactness in camera construction is a very desirable quality, greatly lending itself to camera marketability. Concomitantly, there is great demand to reduce the outer barrel diameter of the zoom lens barrel unit and the barrel depth of the zoom lens barrel unit in its collapsed state.

A conventional zoom lens barrel of the prior art described above, however, has inherent physical characteristics of the design which limit the ability of the designer to improve compactness. This is because their structure requires guide ring 4 for movement in the optical axial direction, linear movement guiding plate 5 and guide groove 1a of fixed barrel 1 in order to restrain the rotation of rear group moving frame 7 and front group moving frame 9.

More precisely, because fixed barrel 1 requires guiding groove 1a to prevent the rotation of guide ring 4, the outer diameter of fixed barrel 1 must be as large as the space taken by guiding groove 1a therein. Therefore, because moving means 3, guiding groove 1a and linear movement guiding plate 5 are positioned in a straight line, the length of zoom lens barrel unit is quite large in its retracted state.

Conventional viewfinders of zoom lens cameras, like the zoom lens barrel units of the prior art described above, are difficult to make more compact because they too require zoom lens barrel units which extend in the optical axial direction. Such conventional viewfinders require that cam portion 2c (shown in FIG. 12) on the outer surface of cam ring 2 contain an angle, α, which produces the desired linear motion in the moving range Y in the optical axial direction. For this reason, it is difficult to reduce the dimension of cam ring 2.

Compactness of zoom lens cameras of the prior art having collapsible mount structures is especially difficult to achieve. Collapsible mount structures require retracting the zoom lens barrel in order to shorten the barrel's length in the optical axial direction when not in use. In such a design, cam ring 2 must be moved a greater distance in the optical direction when zooming (extending) or retracting the lens. Therefore, the moving range Y of cam portion 2c formed on cam ring 2 becomes even larger than is required in the embodiments described above. This further increases the difficulty in improving the compactness of a lens barrel.

Figure 2:
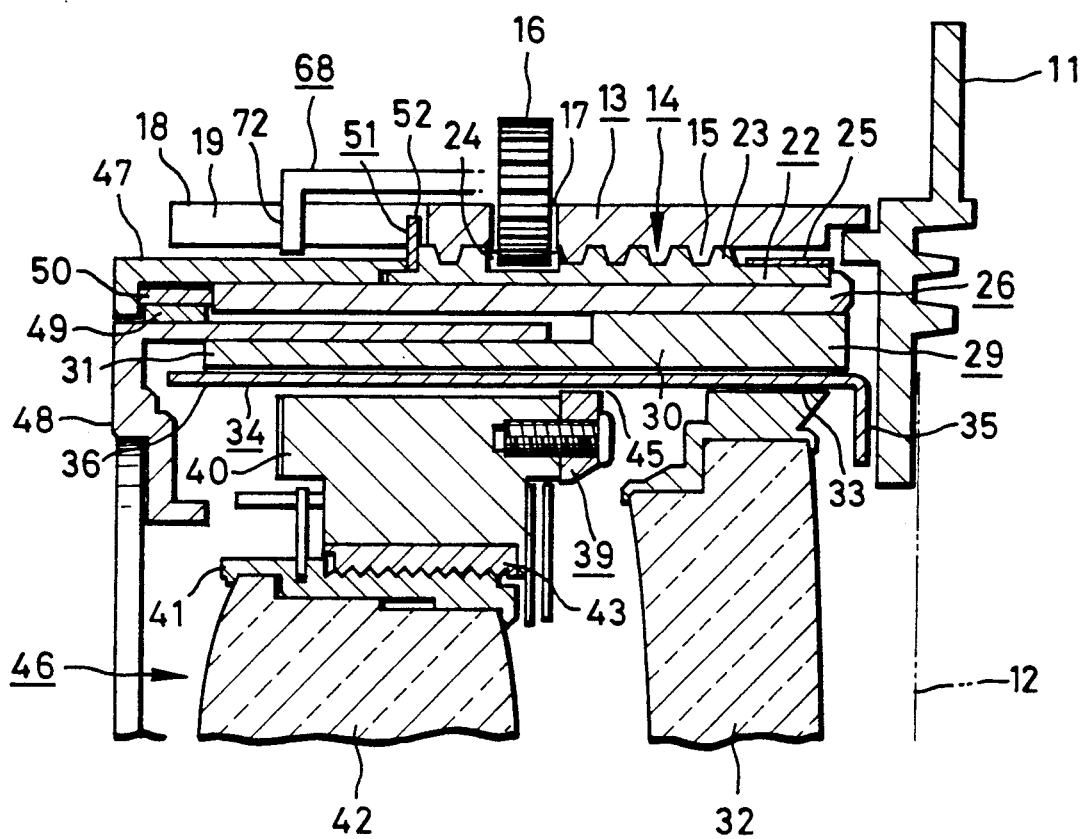
FIG. 2 is a sectional view of the zoom lens barrel unit depicted in FIG. 1 in the retracted state.

Referring to FIG. 2, the zoom lens barrel unit construction of the present invention is now described.

A camera body 11 includes a fixed barrel member 13 fastened at its front end. An outer helicoid portion 15 on the inner surface of a fixed barrel member 13 serves as a moving means 14 for moving a cam ring 26 in the optical axial direction. A window 17 in the middle of fixed barrel member 13 permits contact of pinion gear 16 with outer helicoid portion 15. Pinion gear 16 is rotatable about its axis by a motor (not shown) for zooming motion, i.e., extension and retraction of lens moving groups.

Fixed barrel member 13 also has a front end portion that includes a guiding edge 18 with a guiding recess 19 (shown also in FIG. 1) open in the frontward direction. A supporting block 20 and a cylindrical stud 21 (shown in FIG. 1 view only) are integrally formed behind guiding recess 19 on the outer surface of fixed barrel member 13. Cylindrical stud 21 is disposed on the top of supporting block 20.

Figure 5:
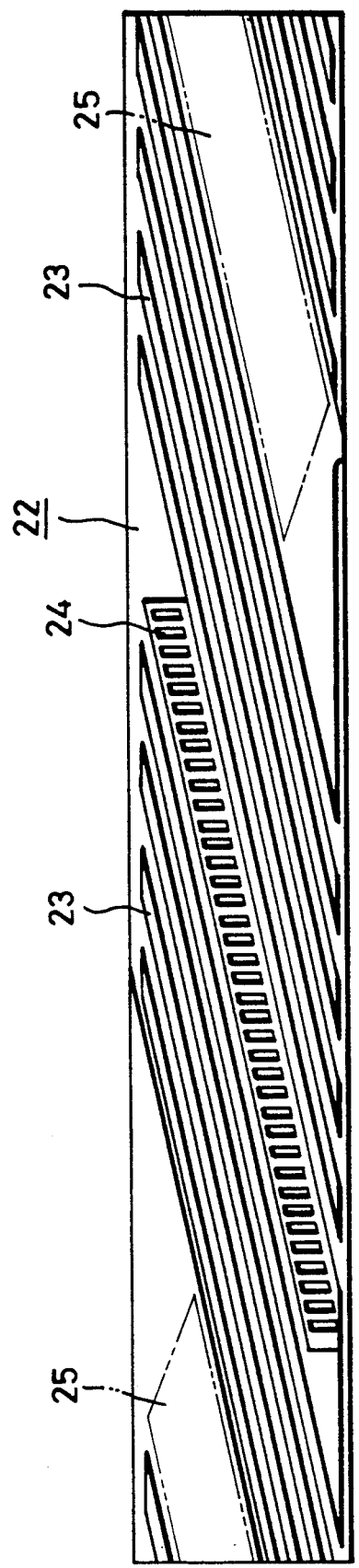
FIG. 5 depicts a development of the inner helicoid ring of the present invention.

An inner helicoid ring 22 inside fixed barrel member 13 (shown also in FIG. 1 and in FIG. 5 as a development view) is in moving contact with moving means 14. An inner helicoid portion 23 is screwed into outer helicoid portion 15. A gear portion 24 on inner helicoid ring 22 faces the inside of window 17 where it is engaged with pinion gear 16. Gear portion 24 always faces the inside of window 17 and is inclined at the same angle as inner helicoid portion 23 thereby continuing to engage pinion gear 16. In addition, a flexible printed board 25 having patterns thereon to enable detection of a zooming position is attached to the outer surface of inner helicoid ring 22.

Figure 3:
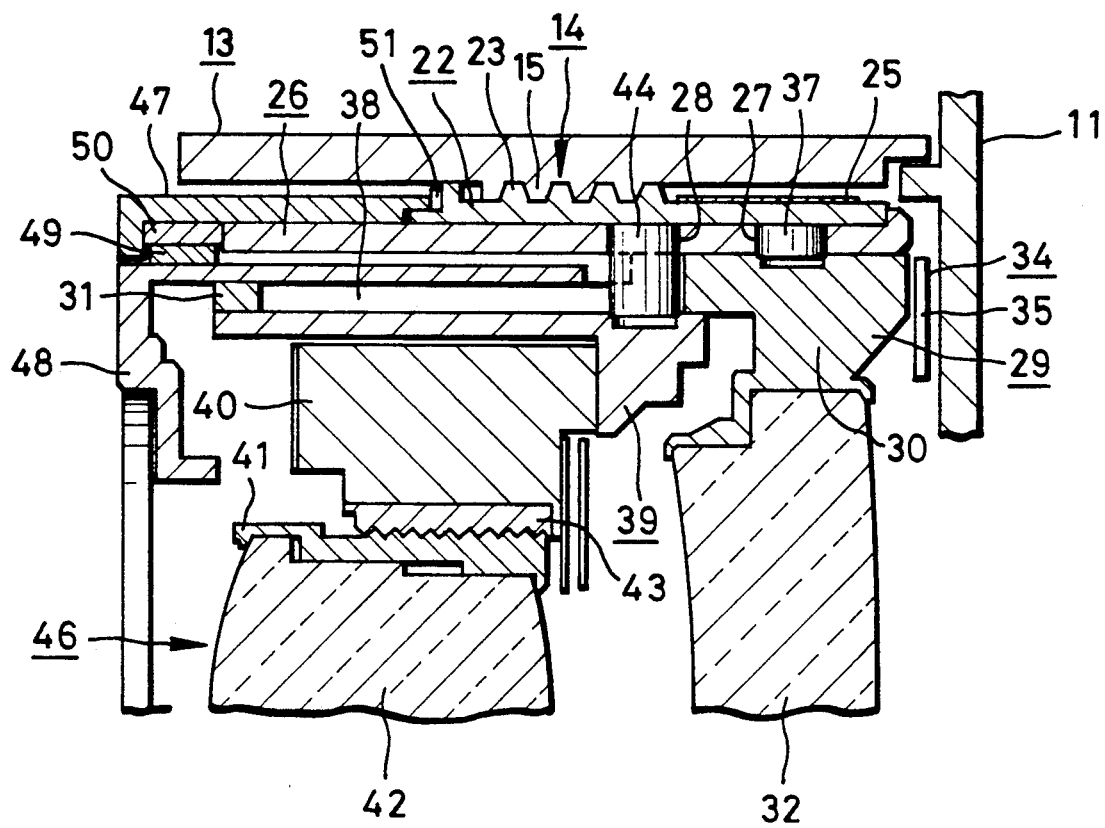
FIG. 3 is a sectional view of another zoom lens barrel unit of the present invention in the retracted state.
Figure 6:
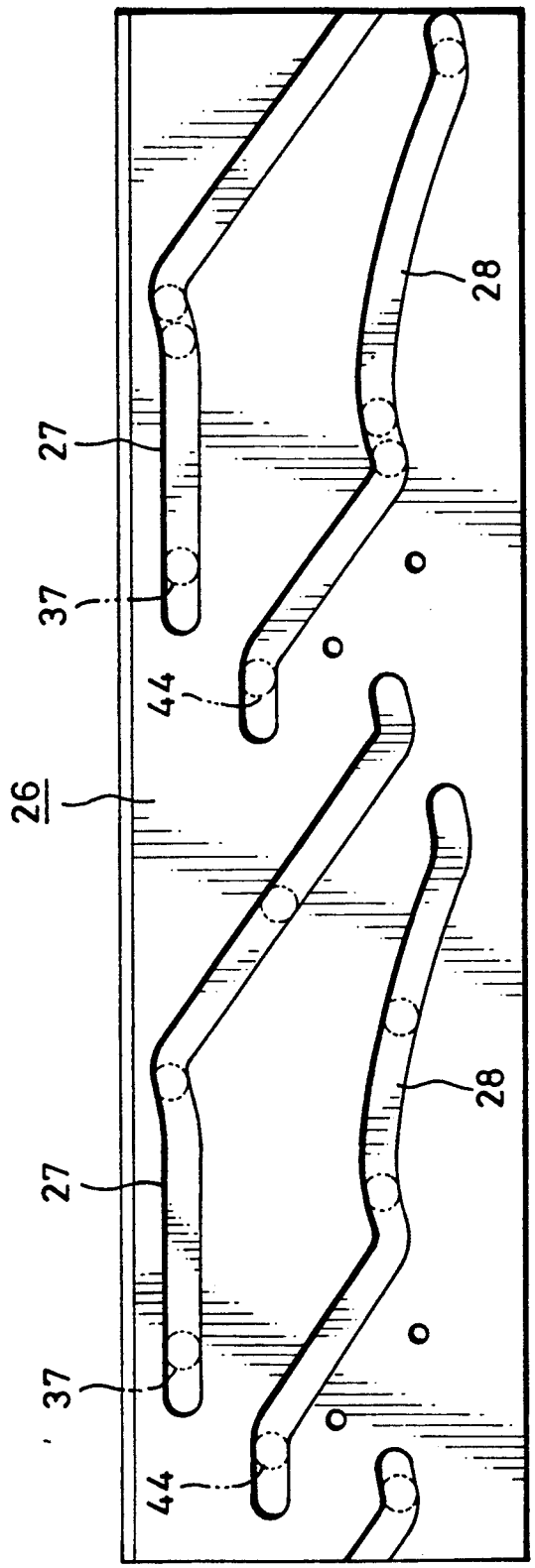
FIG. 6 is a development of the cam ring of the present invention.

Also fastened to the inside of inner helicoid ring 22 is cam ring 26, shown in greater detail in FIGS. 3 and 6, with a cam groove 27 and a cam groove 28. Cam grooves 27 and 28 are formed at two places respectively, each within the circumferential surface of cam ring 26. Cam ring 26 revolves together with inner helicoid 22.

A rear lens group moving member 29 (part of the photographic optical system) is attached to the inside of cam ring 26 in such a manner as to allow movement parallel to the optical axis in conjunction with the rotation of cam ring 26. Rear lens group moving member 29 consists of a base 30 slidably abutting the inner surface of cam ring 26. A barrel portion 31 projects forward from base 30, thereby supporting rear lens group 32 positioned therein.

Base 30 consists of a catching portion 33, consisting of two openings bored through base 30 in the optical axial direction. The surfaces of catching portion 33 are defined by the inner surface of barrel portion 31. A linear movement guiding plate 34 is inserted through each of the surfaces of catching portions 33 of base 30, consisting of a fixed plate portion 35, at the rear end thereof, and a long, narrow guiding plate portion 36. Fixed plate portion 35 is non-movably affixed to fixed barrel member 13 at the rear end thereof. A guiding plate portion 36 is positioned inside and parallel to the optical axis of rear lens group moving member 29.

Base 30 (of rear lens group moving member 29) also includes a guide pin 37, positioned at two places on the outer surface thereof, and insertable through cam grooves 27 and 28 of cam ring 26, respectively. Therefore, rear lens group moving member 29 is restrained by linear movement guiding plate 34 (non-movably affixed to fixed barrel member 13) from revolving and, as cam ring 26 revolves, is moved along cam grooves 27 parallel to the optical axis.

Two linear movement guiding grooves 38 (shown in FIG. 3 and 4) are positioned at different places along the optical axis of rear lens group moving member 29. These linear movement guiding grooves 38 extend from a section of base 30 into barrel portion 31, analogous to and performing an analogous function of cam grooves 28 of cam ring 26.

A front lens group moving member 39, supporting a front lens group 42, is positioned inside rear lens group moving member 29. Attached inside front lens group 42 is a lens frame 41 and a shutter unit 40. An internally threaded ring 43 inside shutter unit 40 engages mating threads on lens frame 41. These characteristics of front lens group moving member 39 permit front lens group moving member 39 to move along the optical axis.

Two guide pins 44 on the rear outer surface of front lens group moving member 39 (seen more clearly in FIG. 4) are insertable through linear movement guiding grooves 38 of rear lens group moving member 29 into cam grooves 28 of cam ring 26. Front lens group moving member 39 includes a clearance groove 45 for preventing interference with guiding plate portion 36 of linear movement guiding plate 34.

Accordingly, front lens group moving member 39 is restrained from rotational movement by rear lens group moving member 29, which is itself restrained from revolving with cam ring 26 by linear movement guiding plate 34. Rotational movement of cam ring 26, therefore, causes front lens group moving member 39 to move along cam grooves 28 parallel to the optical axis, thereby effecting extension and retraction of front lens group 42.

The above-described structure and operation makes it unnecessary to form guiding grooves on the inside of a fixed barrel member, unlike the structure of a conventional zoom lens barrel unit. Without a need for inner barrel guiding grooves, the present invention permits reducing the outer dimension of the barrel by the amount of space normally allotted for the guiding grooves.

A further reduction in size is realized because outer helicoid 15 is not a separate part of fixed barrel member 13 but is formed inside the barrel as distinguished from a conventional zoom lens barrel member. This unified design provides a one piece barrel structure which reduces the number of parts. The number of parts is further reduced because the present invention makes operation possible without a guiding ring (denoted by numeral 4 in FIG. 10), required for operation of a conventional lens barrel.

The overall length of the lens barrel in the fully retracted state is further reduced in the present invention because moving means 14 for moving cam ring 26 and linear movement guiding plate 34 are disposed parallel to each other along the optical axis, not end to end along the optical axis as in the barrel members of the prior art.

Referring now to FIG. 9a, 9b, 9c and 9d, a detailed explanation of the reduction of the length of the zoom lens barrel unit in the retracted state will now be explained.

Figure 9:
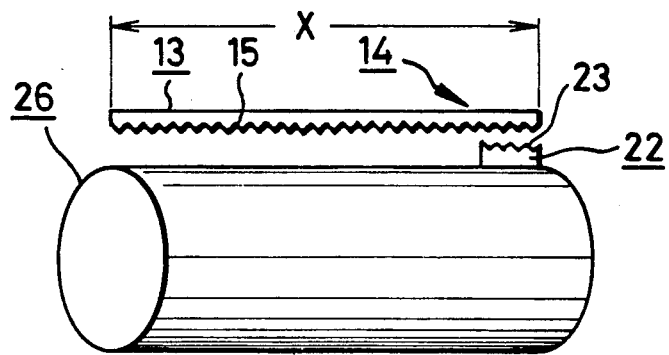
FIG. 9a and 9b depict an embodiment of the present invention for use with an explanation and comparison of dimensions of a conventional zoom lens camera device of the prior art, depicted in FIG. 9c and 9d.
FIG. 9c and 9d depict a conventional zoom lens camera device of the prior art for use with an explanation and comparison of dimensions of an embodiment of the present invention, depicted in FIG. 9a and 9b.
Figure 9:
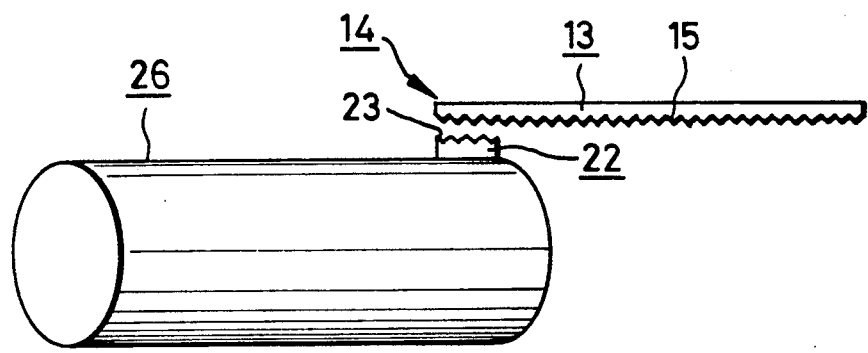
Figure 9C:
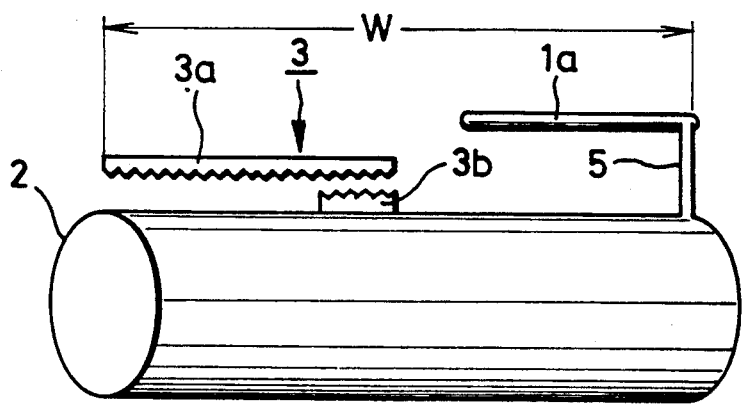
Figure 9D:
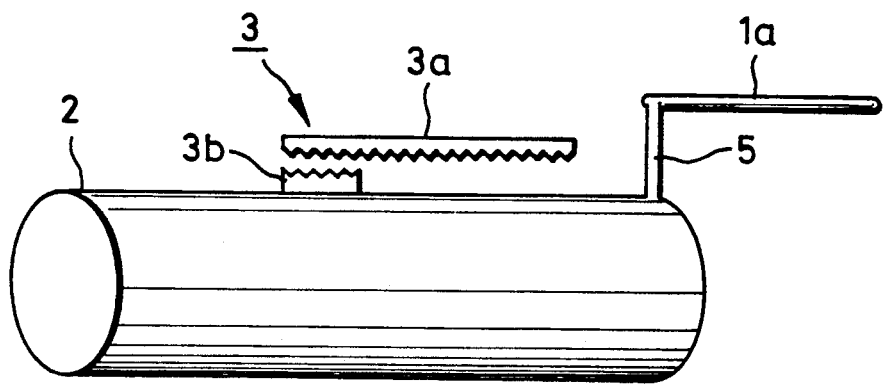

FIG. 9a and 9b depict a lens barrel unit of the present invention in both its retracted and extended telephoto state. FIG. 9c and 9d illustrate the conventional lens of the prior art in its retracted and extended telephoto state.

In FIG. 9d, a conventional lens barrel of the prior art shows outer helicoid 3a of moving means 3 and guiding groove 1a positioned in a straight line along the optical axis. The length of the lens barrel is the sum of the length of cam ring 2 and the length of guiding groove 1a. In contrast, the embodiment of the present invention shown in FIG. 9b, with the lens barrel unit of the present invention in its extended state (FIG. 9b), moving means 14 and linear movement guiding means 34 (not shown) are juxtaposed along the optical axis. The length of outer helicoid 15 and cam ring 26 define the length of the lens barrel in its fully extended state.

FIG. 9c shows a conventional lens barrel of the prior art in its retracted state wherein outer helicoid 3a of moving means 3 and guiding groove 1a are positioned in a straight line along the optical axis. Therefore, the minimum lens barrel length W is the sum of the respective lengths of outer helicoid 3a and guiding groove 1a in the retracted state. In contrast, in the present invention, shown in FIG. 9a, when the lens barrel unit of the present invention in its retracted state, moving means 14 and linear movement guiding means 34 (not shown) are juxtaposed along the optical axis. Therefore, the length of either outer helicoid 15 or cam ring 26 is sufficient for a lens barrel of length X in the retracted state, without requiring a length equal to the sum of these elements.

Consequently, a conventional lens barrel of the prior art and the lens barrel unit of the present invention have the same length in the extended telephoto state but differ in the lens length in the retracted state, i.e. W is much greater than X. The present invention makes it possible to reduce the length of the lens in the retracted state by the difference between W and X.

A viewfinder optical system of a zoom lens camera of the present invention will now be described with reference to FIGS. 1 and 2.

Rear lens group 32 and front lens group 42 comprise a photographic optical system 46. Therein, an outer lens frame cover 47 and an inner lens frame cover 48 are fastened to the front end of the respective outer surfaces of cam ring 26 and front lens group moving member 39. A packing holder 50 having a packing 49 stuck thereto is positioned revolvably between outer lens frame cover 47 and outer lens frame cover 48, whereby packing 49 abuts against the outer circumferential surface of inner lens frame cover 48 to prevent leakage of light.

An interlocking ring 51 is fitted revolvably between inner helicoid ring 22 and outer lens frame cover 47. A projecting ridge 52 of interlocking ring 51 fits into guiding recess 19 of fixed barrel member 13 in such a manner as to be movable in the optical axial direction.

Figure 1:
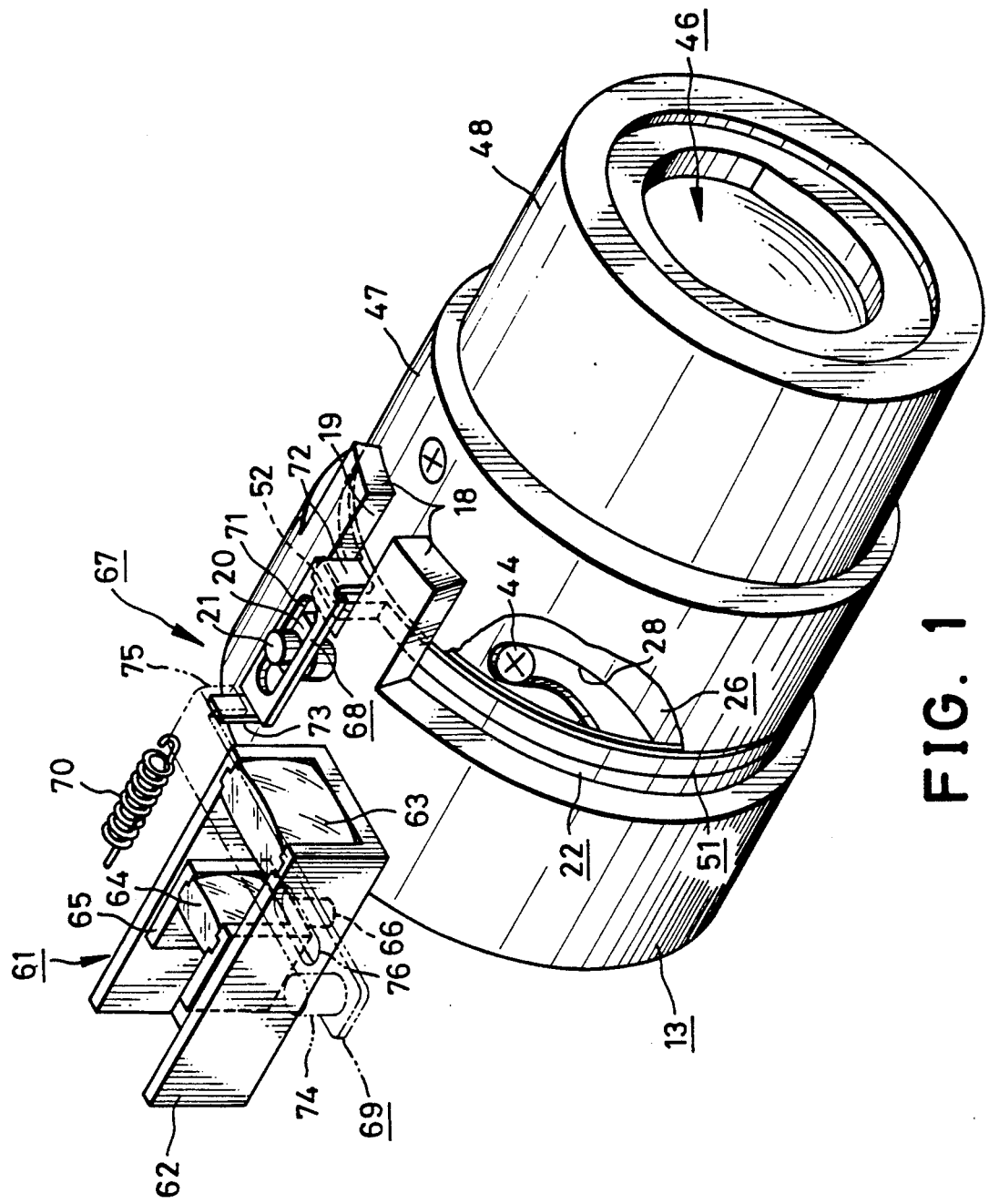
FIG. 1 is a perspective view of a zoom lens camera having a zoom lens barrel unit and a viewfinder according to an embodiment of the present invention.

Referring to FIG. 1, viewfinder body 62 is attached to camera body 11, facing in the direction of the optical axis of the lens barrel of the zoom lens.

A viewfinder optical system 61 consists essentially of viewfinder body 62, having a generally expandable section, a lens 63 non-movably affixed to the front end of viewfinder body 62, and a lens frame 65 behind lens 63 in a rearward optical axial direction fixedly holding a lens 64. Lens frame 65 is movable in the optical axial direction. A stud portion 66 on the bottom of lens frame 65 projects downward through an elongated hole bored along the optical axis in viewfinder body 62 (not shown in FIG. 1).

An interlocking means 67 moves lens frame 65 of viewfinder optical system 61 in the optical axial direction interlocked with the optical axial movement of ridge 52 of interlocking ring 51. Interlocking means 67 consists of a lever 68, a lever 69 and a spring 70.

Lever 68 (also shown in FIG. 2) is supported on holder 20, with stud 21 of fixed barrel member 13 inserted through an elongated hole 71 thereof, and movable in the optical axial direction. The front end of lever 68 is bent downward, forming a catching portion 72. Catching portion 72 hooks onto the front end of ridge 52 of interlocking ring 51. The rear end of lever 68 is bent upward, forming catching portion 73.

Lever 69 is attachable at one end to shaft 74. At the other end of lever 69 is a catching portion 75, for hooking onto the front end of a catching portion 73 of lever 68. A slot 76 in the middle of lever 69 permits the passage therethrough of stud portion 66 of lens frame 65.

Operation of the zoom lens barrel unit of the present invention will now be described with reference to FIG. 2, 3 and 4.

With reference to FIG. 2, cam ring 26 is in an extended rearward position, with ridge 52 of interlocking ring 51 (also retracted) positioned behind and separated from catching portion 72 of lever 68. Viewfinder optical system 61 (FIG. 1) is in its extended wide-angle state.

If pinion gear 16 is rotated, cam ring 26 revolves and is moved forward in the optical axial direction by outer helicoid portion 15 of moving means 14. As a result of this forward movement of cam ring 26, ridge 52 of interlocking ring 51 concurrently moves forward in guiding recess 19.

The rotational movement of cam ring 26 also causes rear lens group moving member 29 to move in the optical axial direction.

Figure 4:
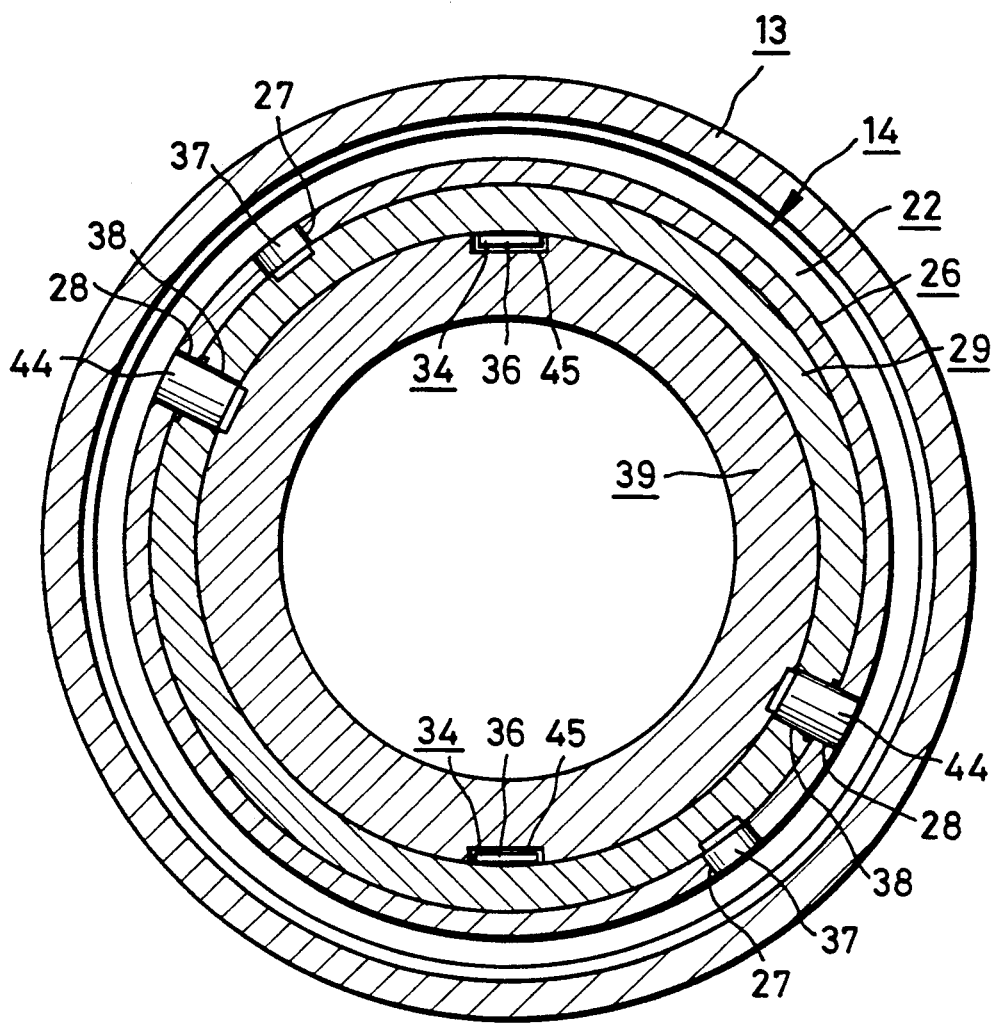
FIG. 4 is a sectional view of the zoom lens barrel unit, taken along IV—IV of FIG. 3.

FIG. 4 depicts a view useful in describing the operational forward movement of rear lens group moving member 29. As cam ring 26 revolves, guide pins 37 are inserted from rear lens group moving member 29 into cam grooves 27 of cam ring 26. Concurrently, rear lens group moving member 29, rotation of which is restrained by linear movement guiding plate 34, moves in the optical axial direction along cam grooves 27.

As rear lens group moving member 29 moves foreword, guide pins 44 of front lens group moving member 39 follow linear movement guiding grooves 38 of rear lens group moving member 29 into respective cam grooves 28 of cam ring 26. Because front lens group moving member 39 is restrained from revolving by guide pins 44, front lens group moving member 39 moves in the optical axial direction, along cam grooves 28.

The present invention makes it is possible to restrain rear lens group moving member 29 from revolving using linear movement guiding plate 34 fixed to fixed barrel 1 and to restrain front lens group moving member 39 by means of linear movement guiding grooves 38 of the rear lens group moving member 29.

Therefore, unlike a conventional zoom lens barrel, it is not necessary to form guiding grooves inside the fixed barrel member and consequently, it is possible to reduce the outer dimension of the barrel by the space otherwise taken by the grooves.

Figure 7:
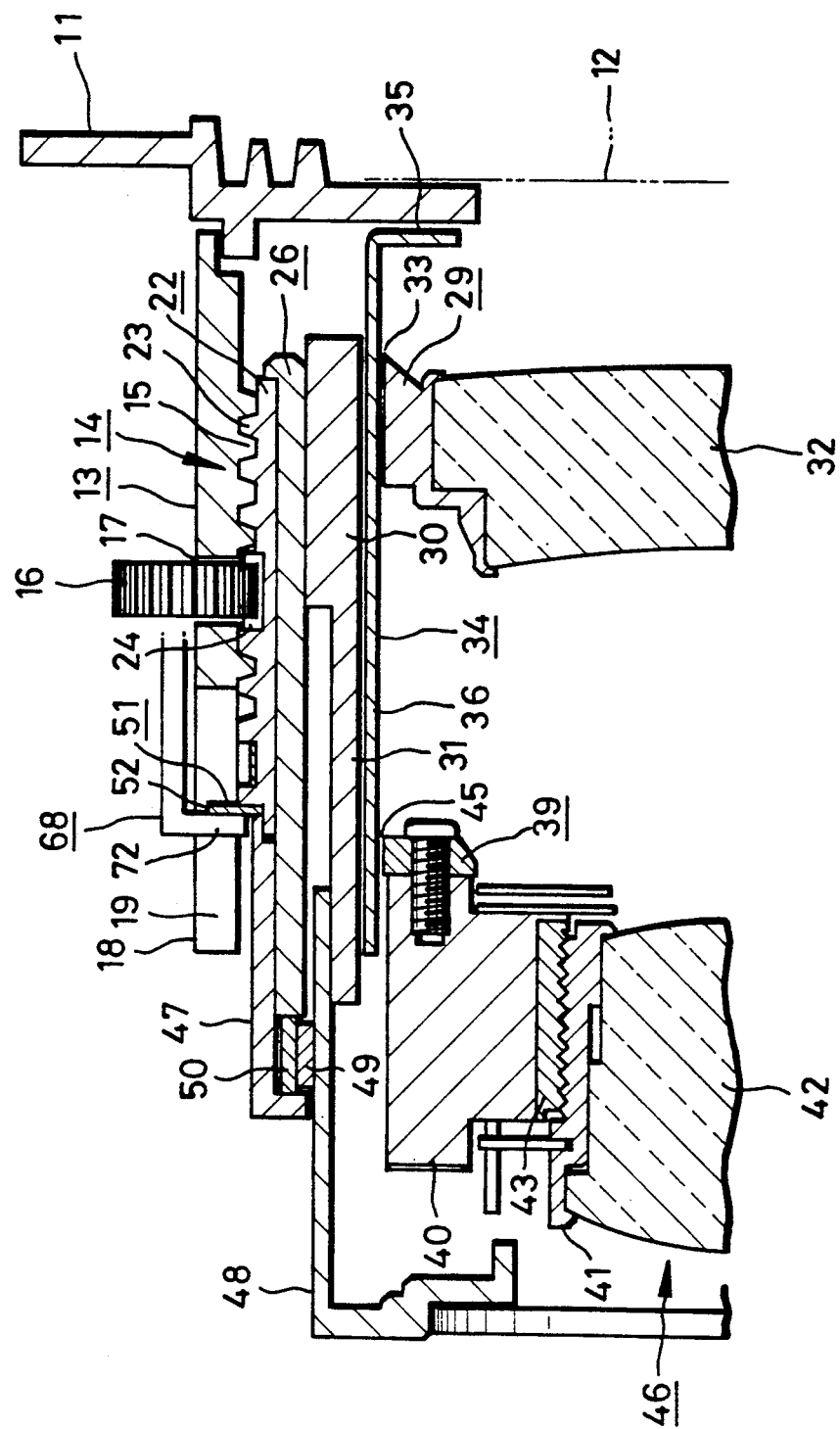
FIG. 7 is a sectional view of the zoom lens barrel unit of the present invention depicted in an extended wide-angle state.

Referring now to FIG. 7, the zooming operation of viewfinder optical system 61 will now be described.

Figure 8:
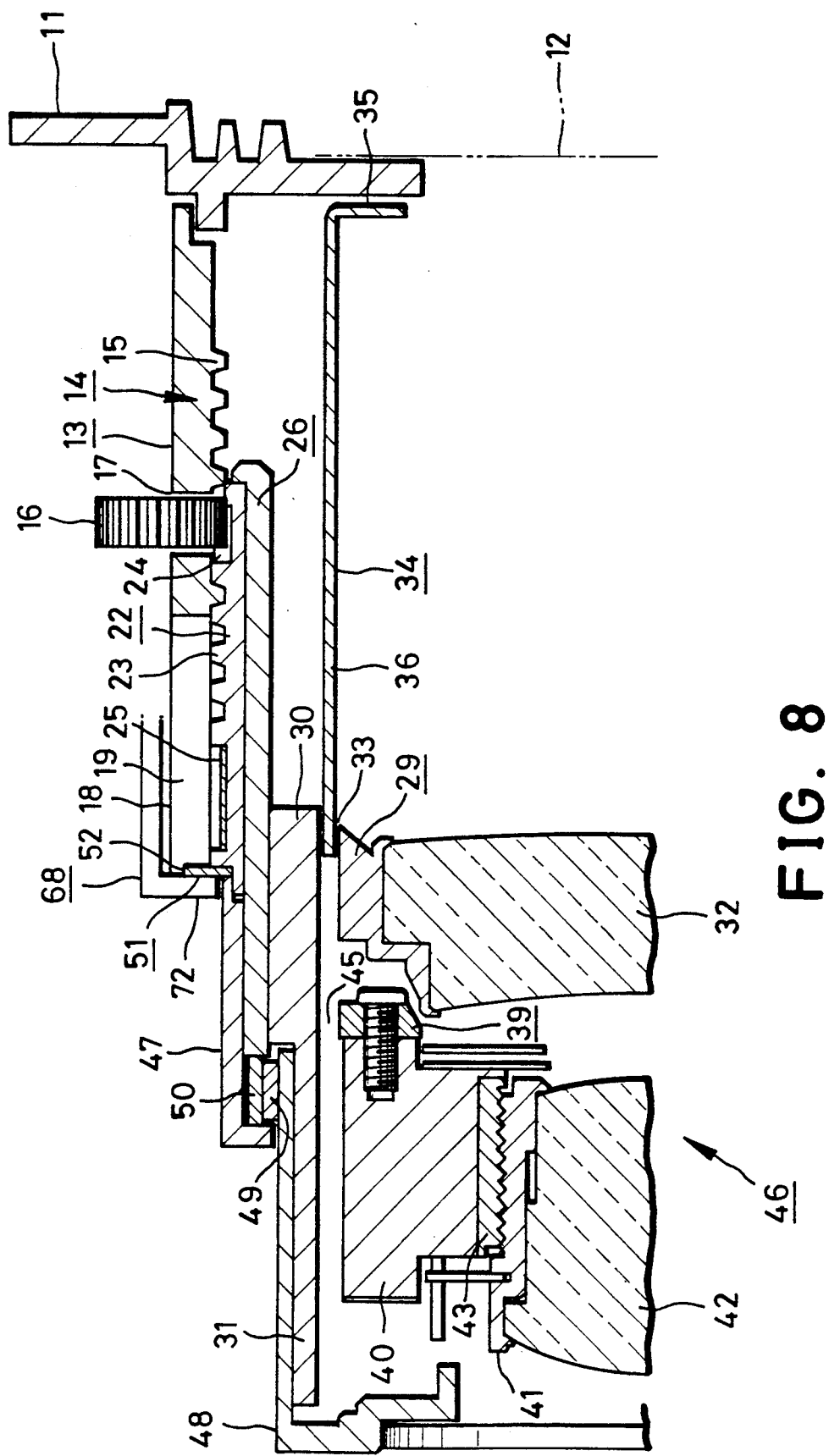
FIG. 8 is a sectional view of the zoom lens barrel unit of the present invention depicted in an extended telephoto state.

When cam ring 26 is moved forward to the extended wide-angle state, ridge 52 of interlocking ring 51 abuts against catching portion 72. Then (as shown also in both FIG. 1 and 8), lever 68 moves forward concurrently with the forward movement of interlocking ring 51. As lever 68 moves forward, lever 69 advances in the forward direction, thereby advancing lens 64.

In order to retract lens 64, the above process is operated in the reverse direction. Cam ring 26 is rotated in the reverse direction to that causing advancement in the optical axial direction. Rear lens group moving member 29 and front lens group moving member 39 are thereby caused to move rearwardly respectively along cam grooves 27 and 28. Consequently, interlocking ring 51, lever 68, lens 64, and lever 69 (being pushed rearward by spring 70) are also retracted. When the zoom lens is in its extended wide-angle state (shown in FIG. 7), the back portion of elongated hole 71 of lever 68 abuts against stud 21 thereby preventing further movement thereof. Consequently, ridge 52 of interlocking ring 51 is removed from catching portion 72 of lever 68.

Operation of the viewfinder optical system in conjunction with operation of the zoom lens barrel unit is as follows.

Spring 70 attaches to the end of lever 69, pulling levers 68, 69 and lens frame 65 rearward. When lens 64 is retracted, stud 21 abuts against the front end of elongated hole 71 of lever 68 thereby restraining levers 68, 69 and lens frame 65 from further rearward motion. Levers 68, 69 and lens frame 65 are thereby released from engagement with interlocking ring 51, consequently breaking interlock with viewfinder optical system 61. In such an arrangement, when rearward movement is restrained, viewfinder optical system 61 is held at a position corresponding to the extended wide-angle position of the zoom lens.

As described, viewfinder optical system 61 is moved in the optical axial direction interlockingly with the optical axial directional movement of interlocking ring 51. Therefore, since there is no need to provide a bulky cam portion on the outer surface of the cam ring, a more compact zoom lens barrel unit is provided.

This is especially the case of a zoom lens camera using a collapsible mount structure, which calls for retracting the zoom lens barrel unit to reduce its length in the optical axial direction when the camera is not in use. Retraction and extension in such a zoom lens camera design requires that the cam ring 26 be moved extensively in both optical axial directions when zooming or collapsing the lens. Consequently, zoom lens barrels of conventional cameras are unavoidably large in the optical axial direction. A zoom lens camera according to the present invention, however, makes possible a compact zoom lens barrel unit using interlocking ring 51.

Also, when retracting the lens of a collapsible barrel of a barrel unit made in accordance with the present invention, it becomes possible to break interlock between interlocking ring 51 and interlocking means 67. Viewfinder optical system 61 may thereby be maintained at the extended wide-angle state without using any special mechanism.

Further, the present invention makes available a more compact zoom lens barrel unit by juxtaposing in the optical axial direction the moving means that move the cam ring and the linear movement guiding plate.

Still further a revolvable interlocking ring on the outer surface of the cam ring provides for interlocking movement in the optical axial direction interlocking with the rotational movement of the interlocking ring. The viewfinder optical system is thereby moved in the optical axial direction through interlocking means that operate together with the movement of the interlocking ring in the optical axial direction. This allows for a more compact zoom lens barrel unit due to the elimination of the need to provide a bulky cam portion on the outer surface of the cam ring.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A zoom lens barrel unit comprising:
   a fixed barrel member;
   at least first and second lens groups;
   a cam ring concentrically disposed inside said fixed barrel member;
   a plurality of cam grooves in said cam ring for guiding said at least two lens groups;
   moving means positioned between said fixed barrel member and said cam ring for moving said cam ring linearly in each of opposite directions along an optical axis about which said cam ring is rotatable and when said cam ring is rotated;
   a linear movement guiding plate disposed within said cam ring parallel to the optical axis and fixed at an end thereof to said fixed barrel member, said linear movement guiding plate being juxtaposed longitudinally with the said cam ring moving means;
   a rear lens group moving member concentrically disposed inside said cam ring and supporting a rear lens group, said rear lens group moving member being movable in the optical axis direction, said linear movement guiding plate having a length which corresponds to a distance range in which the rear lens group moving means can move;
   said rear lens group moving member including a plurality of guide pins received through a set of rear lens group cam grooves of said cam ring whereby said rear lens group moving member is caused to move responsive to rotative/linear movement of said cam ring, said rear lens group moving member carrying catch structure, said linear movement guiding plate extending through the catch structure in the optical axial direction whereby the linear movement guiding plate restrains rotation of the rear lens group moving member about the optical axis, and a plurality of linear movement guiding grooves formed in said rear lens group moving member in the optical axial direction; and a front lens group moving member concentrically disposed inside said rear lens group moving member and supporting a front lens group;

said front lens group moving member including a plurality of guide pins received in said plurality of linear movement guiding grooves of said rear lens group moving member and a set of front lens group cam grooves in said cam ring.

* * * * *